United States Patent [19]
Stewart et al.

[11] Patent Number: 5,507,000
[45] Date of Patent: Apr. 9, 1996

[54] SHARING OF REGISTER STACK BY TWO EXECUTION UNITS IN A CENTRAL PROCESSOR

[75] Inventors: Wilbur L. Stewart, Phoenix; Ronald E. Lange, Glendale; Richard L. Demers, Peoria; Jeffrey D. Weintraub, Scottsdale, all of Ariz.

[73] Assignee: Bull HN Information Systems Inc., Billerica, Mass.

[21] Appl. No.: 311,797

[22] Filed: Sep. 26, 1994

[51] Int. Cl.⁶ .............................. G06F 9/00; G06F 9/302
[52] U.S. Cl. ........................ 395/800; 364/736; 364/232.8; 364/258; 364/DIG. 1
[58] Field of Search ..................................... 395/800, 824, 395/825; 364/736, 740, 741, 786, 133, 131

[56] References Cited

U.S. PATENT DOCUMENTS

| | | | |
|---|---|---|---|
| 4,396,979 | 8/1983 | Mor et al. | 395/775 |
| 4,777,594 | 10/1988 | Jones et al. | 395/375 |
| 4,872,131 | 10/1989 | Kubota et al. | 364/736 |
| 5,072,418 | 12/1991 | Boutaud et al. | 364/715.06 |
| 5,204,828 | 5/1993 | Kohn | 364/736 |
| 5,272,660 | 12/1993 | Rossbach | 364/748 |

*Primary Examiner*—Alyssa H. Bowler
*Assistant Examiner*—Dhiren R. Odedra
*Attorney, Agent, or Firm*—J. S. Solakian; J. H. Phillips

[57] ABSTRACT

In a central processor incorporating at least one co-processor, such as a floating point arithmetic co-processor, in addition to a basic arithmetic logic unit, the problem of rationalizing the contents of the accumulator and supplementary accumulator registers without the burden of speed penalties is addressed and solved. This is achieved by providing input/output access to a common register file and by switching control of the register file to the proper processing unit appropriately. A single, shared accumulator register and a single, shared supplementary accumulator register are included in the stack along with other sharable registers such as address modification registers. Thus, the contents of the accumulator register and the supplementary accumulator register are always up-to-date and available to all processing units in the central processor without the need for first carrying out rationalization steps.

2 Claims, 4 Drawing Sheets

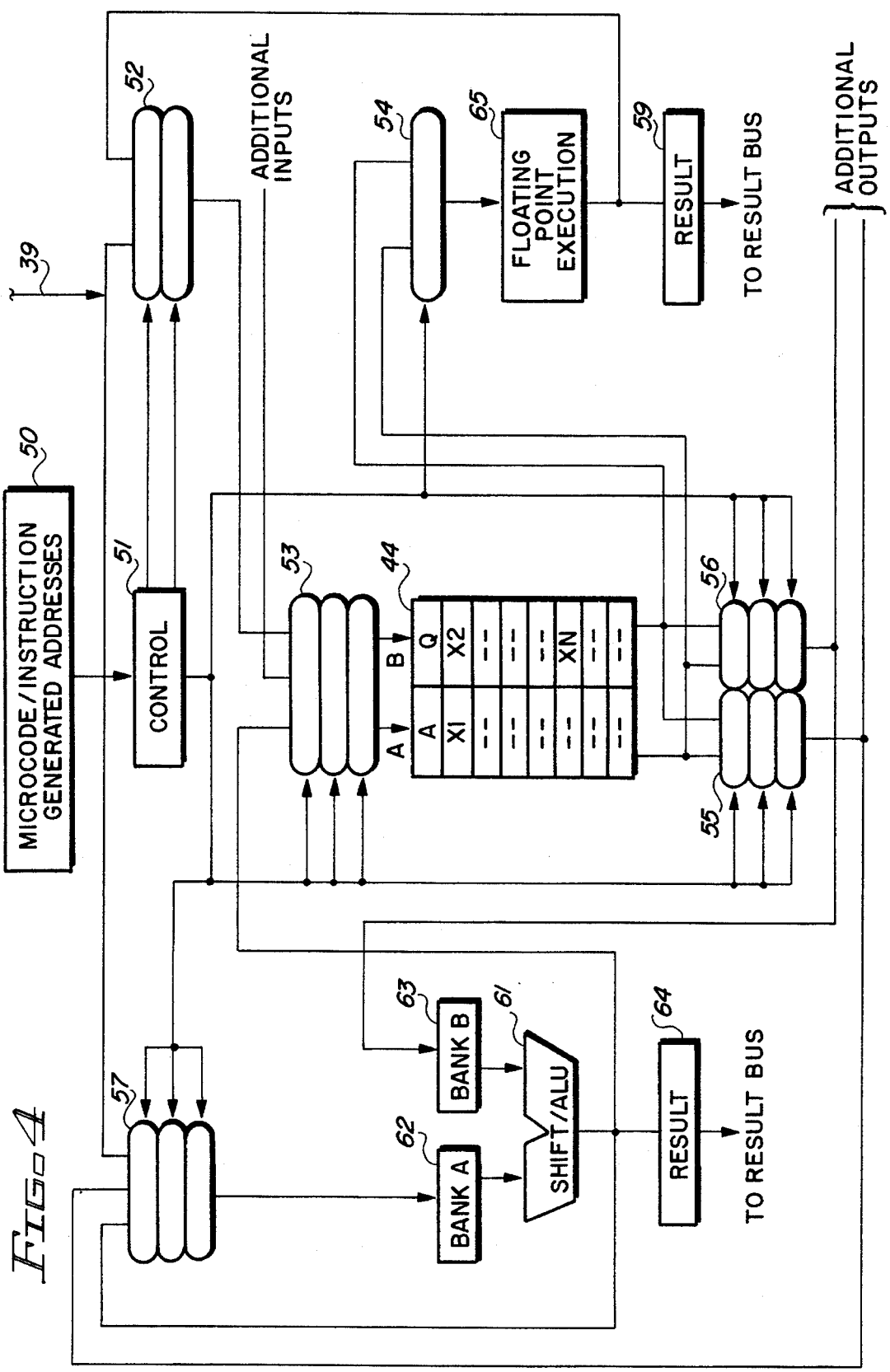

SHARING OF REGISTER STACK BY TWO EXECUTION UNITS IN A CENTRAL PROCESSOR

FIELD OF THE INVENTION

This invention relates to computer central processors and, more particularly, to an efficient structure for integrating the operations of an address and execution unit and a floating point unit within a highly integrated central processor.

BACKGROUND OF THE INVENTION

Computer central processors typically include a basic operations execution unit which performs much of the routine processing including adding, subtracting, logical combining and other logical manipulation of information words. The basic operations execution unit may also perform all multiplication and division, but the performance of the central processor is markedly enhanced if more complex calculations, such as floating point operations, are assigned to a co-processor.

Central processor calculation units include a number of dedicated registers including an accumulator register (often called the "A register") and a supplementary accumulator register (often called the "Q register") which may be concatenated with the A register to hold a double word information operand (or two single word operands) or result. Typically, there are a number of other dedicated registers (often called the "X" registers) which serve as address modification registers. For convenience, these dedicated registers will be designated as AQX registers below; however, those skilled in the art will understand that they may have different designations in various specific central processors.

In the case of a central processor incorporating a co-processor as well as a basic operations execution unit, it has been the practice to provide each calculation unit with its own pair of A-Q registers. If the basic operations execution unit decodes an instruction which has been predetermined to be better handled by the co-processor, in part or in whole, the task is assigned to the co-processor by the basic operations execution unit which also forwards to the co-processor the contents of its A and Q registers for placement into the corresponding registers in the co-processor. When the co-processor completes its assigned calculation, it signals the basic operations execution unit accordingly, and the control circuitry in the two units coordinates the transfer of the results from the A and Q registers in the co-processor to the A and Q registers in the basic operations execution unit.

While it is a great advantage to include a co-processor in a central processor that must routinely carry out substantial extended calculations, the necessary transfer of data between the respective A and Q registers of the basic operations execution unit and of the co-processor, as described immediately above, "costs" numerous machine cycles which somewhat offsets the speed of performance advantage obtained from the co-processor.

As faster operation of computers has been sought, numerous hardware/firmware features have been employed to achieve that purpose. One widely incorporated feature directed to increasing the speed of operation is pipelining in which the various stages of execution of a series of consecutive machine level instructions are undertaken simultaneously. Thus, during a given time increment, a first stage of a fourth (in order of execution) instruction may be undertaken while a second stage of a third instruction, a third stage of a second instruction and a fourth stage of a first instruction are all undertaken simultaneously.

In a pipelined central processor, the incorporation of a co-processor has a further drawback which also offsets some of the speed advantage obtained thereby. It is necessary to keep track of which A-Q register pair is "correct" and, at times, to stop the pipeline to update one register pair from the other before it can be used.

Those skilled in the art will appreciate that it would be highly desirable to employ a co-processor in a central processor, which may or may not be pipelined, without incurring the offsetting speed penalties resulting from each of the basic operations execution unit and the co-processor employing its own pair of A and Q registers.

OBJECTS OF THE INVENTION

It is therefore a broad object of this invention to provide, in a central processor, a basic operations execution unit and a co-processor which operate independently, but which do not require dedicated machine steps to transfer operands and results therebetween.

It is a more specific object of this invention to provide such a central processor in which a basic operations execution unit and a co-processor share access to an accumulator, a supplementary accumulator and other registers in order to avoid the dedicated machine steps heretofore required to transfer operands and results therebetween.

SUMMARY OF THE INVENTION

Briefly, these and other objects of the invention are achieved by providing input/output access to a common register file, which includes an accumulator register and a supplementary accumulator register, and by switching control of the register file to the proper processing unit appropriately.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 4 is a data flow diagram of the subject invention.

DESCRIPTION OF THE PREFERRED EMBODIMENT(S)

Figure 1:
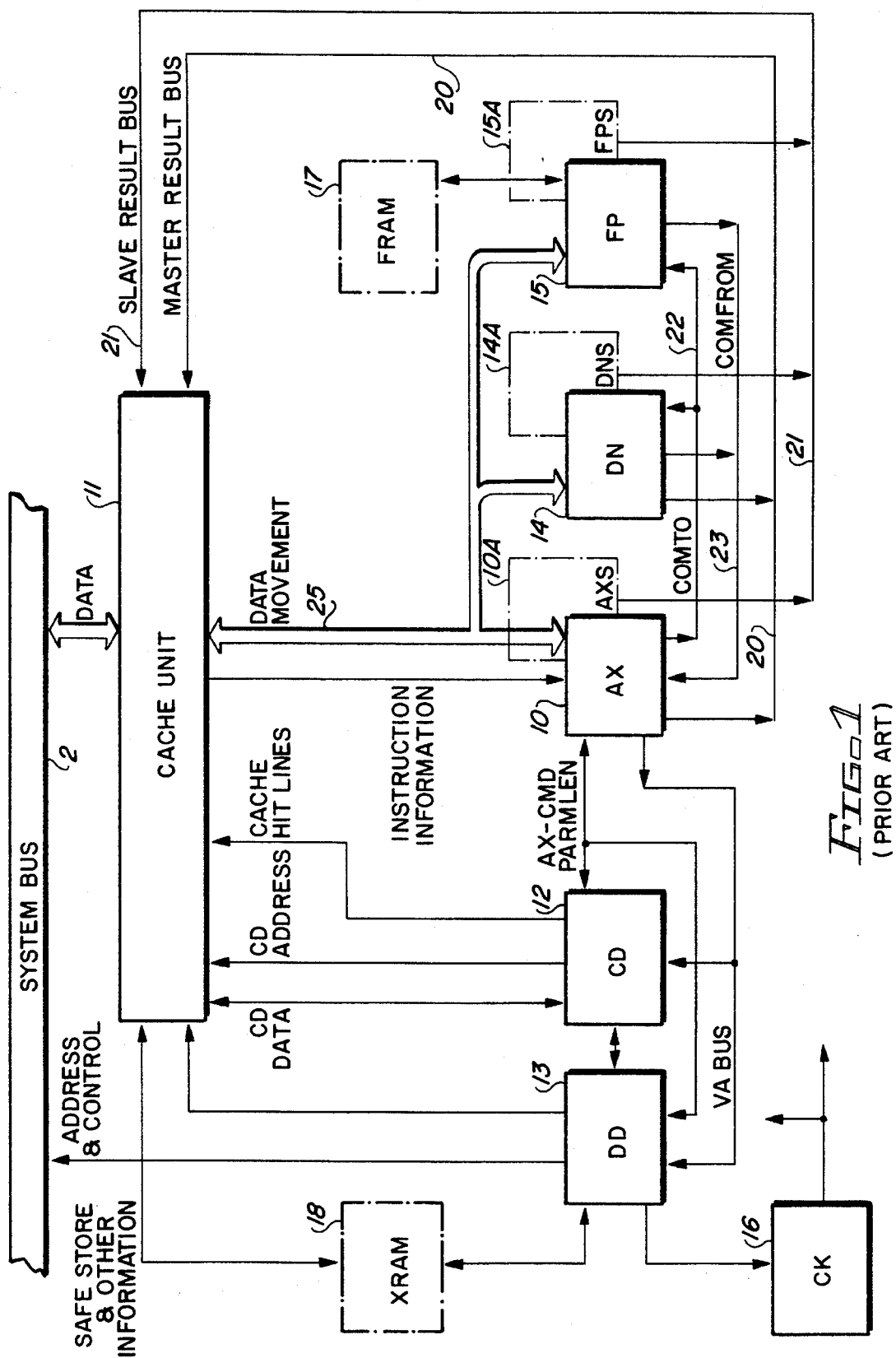
FIG. 1 is a high level block diagram which illustrates a prior art central processor in an architecture to which the subject invention may be adapted.

Referring to FIG. 1, the address and execution section is a microprocessing engine which performs all address preparation and executes all instructions except decimal arithmetic, binary floating point and multiply/divide instructions. Two identical AX units 10, 10A perform duplicate actions in parallel, and the resulting AX unit outputs are constantly compared to detect errors. The main functions performed by the AX units include:

effective and virtual address formation;

memory access control;

security checks;

register change/use control;

execution of basic instructions, shift instructions, security instructions, character manipulation and miscellaneous instructions. In the exemplary CPU in which the invention is incorporated, a cache storage unit 11 stores 64K bytes (16K words). A set associative directory, which defines the main memory location of each 64-byte (16-word) block stored in the cache storage unit, includes a cache directory (CD) unit 12 and a duplicate directory (DD) unit 13.

The specific functions performed by the cache storage unit 11 include:

combined instruction and operand data storage;

instruction and operand buffering and alignment;

data interface with the system bus 7;

domain safestore file.

Two copies of the cache directory information are respectively maintained in the CD and DD units which perform different logic functions. The two directory copies allow interrogation of the cache contents from the system bus in parallel and without interference with instruction/operand access from the CPUs and also provide for error recovery. Functions performed by the CD unit 12 include:

cache directory for CPU accesses;

instruction, operand and store buffer management;

virtual-to-real address translation paging buffer.

Functions performed by the DD unit 13 include:

cache directory for system accesses;

system bus control;

distributed connect/interrupt management;

cache directory error recovery.

Efficient scientific calculation capability is implemented on the floating point (FP) coprocessor units 15, 15A. The identical FP units execute all binary floating point arithmetic operations in duplicate. These units, operating in concert with the duplicate AX units 10, 10A, perform scalar or vector scientific processing.

The FP unit 15 (duplicated by the FP unit 15A):

executes all binary and fixed and floating point multiply and divide operations;

computes 12 by 72-bit partial products in one machine cycle;

computes eight quotient bits per divide cycle;

performs modulo 15 residue integrity checks;

executes all floating point mantissa arithmetic;

executes all exponent operations in either binary or hexadecimal format;

pre-processes operands and post-processes results for multiply and divide instructions;

provides indicator and status control.

Two special purpose random access memories (FRAM 17 and XRAM are incorporated into the CPU. The FRAM unit 17 is an adjunct to the FP units 15, 15A and functions as an FP control store. The XRAM unit 18 is an adjunct to the AX units 10, 10A and serves as a scratchpad as well as providing safestore and patch functions.

The CPU also employs a clock distribution (CK) unit 16 whose functions include:

clock distribution to the several units constituting the CPU;

shift path control;

maintenance;

interface between an external clock and maintenance unit and the CPU;

provision of clock stop logic for error detection and recovery.

The DN unit 14 (in parallel with the DN unit 14A) performs the execution of decimal numeric extended instruction set (EIS) instructions. It also executes decimal-to-binary (DTB), binary-to-decimal (BTD) conversion EIS instructions and move, numeric-edit (MVNE) EIS instructions in conjunction with the AX unit 10. The DN unit both receives operands from memory and sends results to main memory (not shown) via the cache storage unit 11.

The AX, DN and FP units, collectively, are sometimes referred to as the basic processing unit (BPU). It was previously noted that the AX, DN and FP units are duplicated with the duplicate units operating in parallel to obtain duplicate results which are available for integrity checking. Thus, master and slave results are obtained in the normal operation of these units. The master results are placed onto a master result bus (MRB) 20 while the slave results are placed onto a slave result bus (SRB) 21. Both the master and slave results are conveyed, on the MRB and SRB respectively, to the cache storage unit 11. In addition, a command to (COMTO) bus 22 and a command from (COMFROM) bus 23 couple together the AX unit, the DN unit and the FP unit for controlling certain interrelated operations.

The present invention is applicable to central processors incorporating a single BPU as well as to those employing duplicate BPUs (whether in a peer or a non-peer configuration) such that the description of the invention and the directly relevant prior art will proceed in single BPU examples. Thus, referring now to FIG. 2, and still discussing the prior art, it will be observed that the AX unit 10 and the FP unit 15 include inter-communicating control circuitry, 30, 31, respectively, for controlling the relatively independent operations of the AX data manipulation logic 32 and the FP data manipulation logic 33. The AX data manipulation logic 32 includes a single-word-wide AQX register stack 34 in which the A and Q registers, as well as other dedicated registers represented by block X1–XN. (not necessarily all true "X" registers), are found. Some of these additional registers may be one full word wide while others may be less than a full word wide. In one specific prior art central processor, the register stack 34 is configured sixteen high by thirty-six bits wide, a single full data word being four nine-bit bytes. The FP data manipulation logic 33 includes a double word AQ register 35 constituting the concatenated A and Q registers, this configuration, of course, being most efficient for double precision operations.

Depending upon the given operation assigned to the FP data manipulation logic 33, the local result obtained thereby may be a true BPU result to be communicated on the two-word wide result bus 20 to the cache unit 11. Or, the local FP result may only be intermediate to the operation being supervised and partially performed by the AX data manipulation logic 32, a condition which requires transfer of the FP local result thereto on the bus 38. Both this FP-to-AX result transfer and a transfer of starting A/Q information from AX-to-FP over the bus 38 must be rationalized to account for the different orientations of the A and Q registers in the AX and FP data manipulation logic circuitry. This task is performed by rationalization logic 36 which includes packing/unpacking and coordination circuitry, all as well known in the prior art.

As previously mentioned, while there are substantial advantages obtained by employing a co-processor in the prior art configuration discussed immediately above, there are also inefficiencies which limit the extent of the advantages. Thus, attention is now directed to FIG. 3 which reveals the present invention directed to overcoming these inefficiencies of the prior art, the same shown in a somewhat simplified block diagram.

Figure 2:
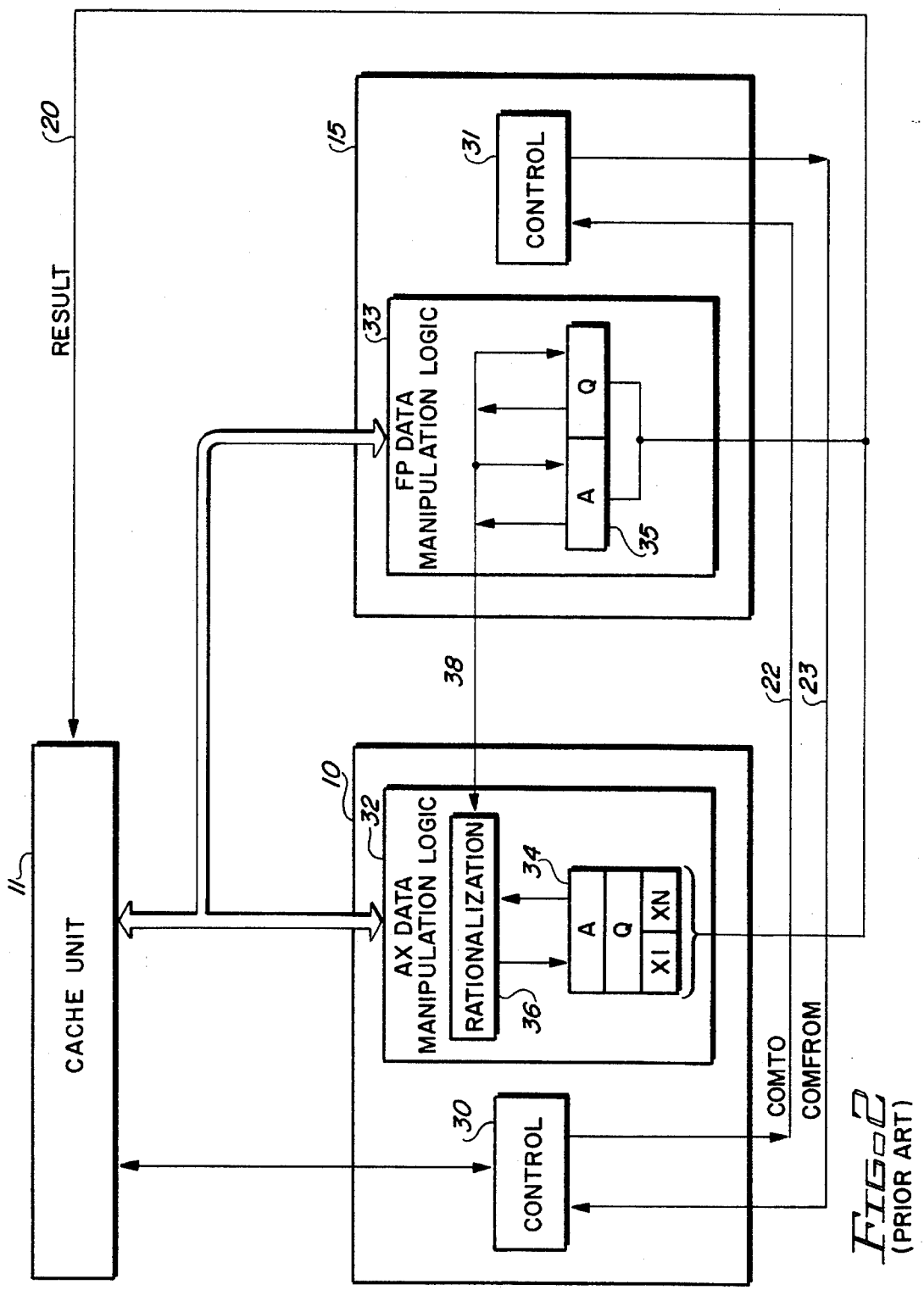
FIG. 2 is a more detailed block diagram of one of the address and execution units and the associated floating point unit of the central processor and illustrates in more detail certain of the prior art hardware logic which is improved by the subject invention.
Figure 3:
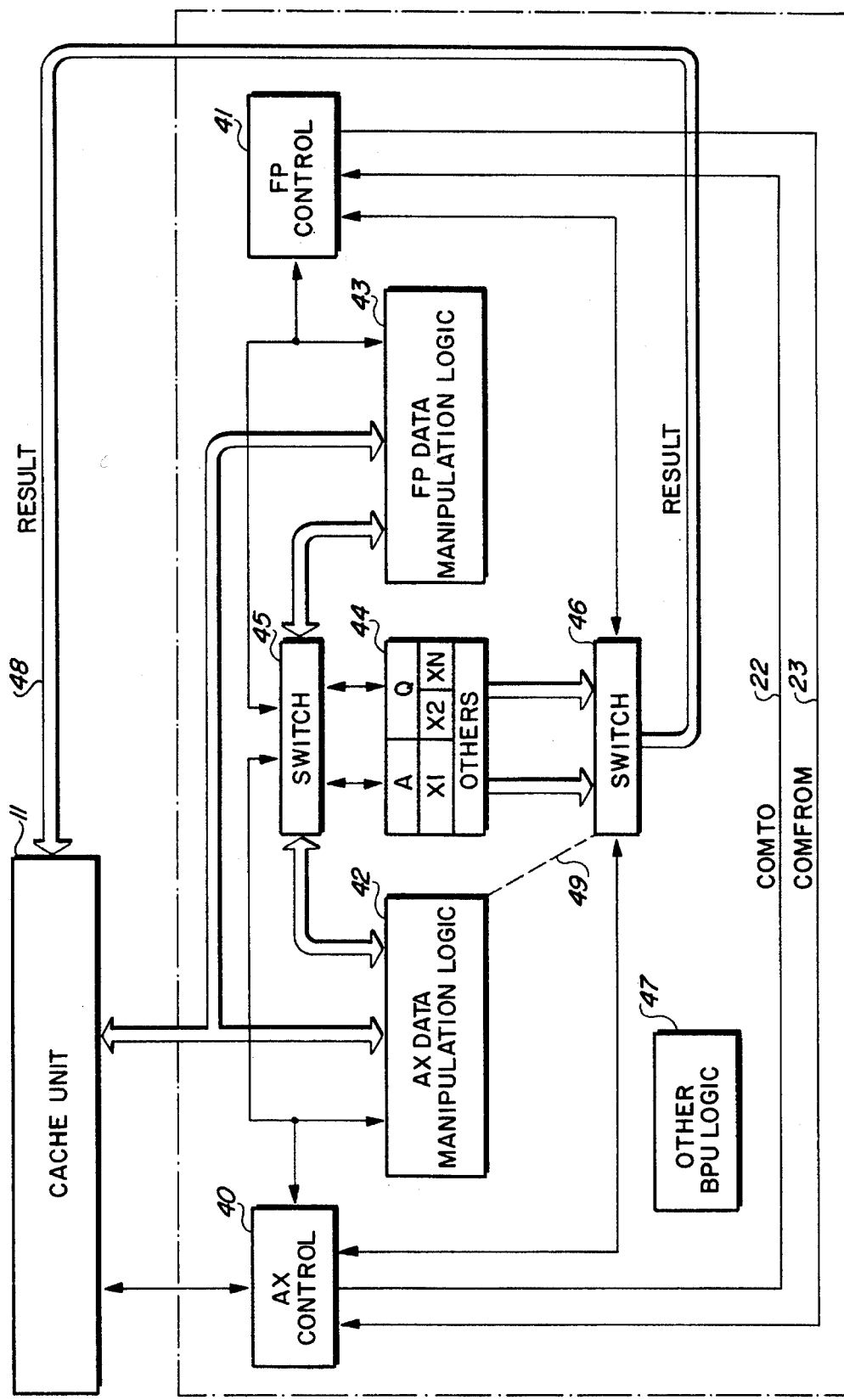
FIG. 3 is a view similar to FIG. 2 illustrating an address and execution unit and its associated floating point unit, which units are configured and interconnected with one another and to adjacent circuitry to incorporate the subject invention.

In the architecture shown in FIG. 3, the AX and FP functions are more closely coupled, and the entire BPU may be considered a single section of a CPU, implementable, with current technology, on a single very large scale integrated circuit chip. AX and FP control circuitry, 40, 41, respectively, inter-communicate on comto bus 22 and com-from bus 23 in a manner similar to the corresponding blocks 30, 3 ! in FIG. 2 to process information received on bus 39 from the cache unit 11. Also similarly, AX data manipulation logic 42 and FP data manipulation logic 43 perform substantially the same functions carried out by the blocks 32, 33 in FIG. 2, but with a fundamental difference in their respective uses of dedicated registers. In the configuration shown in FIG. 3, there is no concatenated AQ register used exclusively by the FP data manipulation logic 43. In contrast, a multi-level AQX register stack 44, differently configured from the AQX register stack 34 in FIG. 2, is shared by the AX data manipulation logic 42 and the FP data manipulation logic 43 by bilateral (i.e., two way) interface switching array circuitry 45 and-output switching array circuitry 46 as coordinated by the AX and FP control blocks, 40, 41, respectively. The remainder of the BPU logic, not directly relevant to an explanation of the present invention, is represented by the block 47.

In a presently preferred embodiment of the invention, the AQX register stack 44 is configured eight high by seventy-two bits wide such that the A and Q registers can be concatenated if desired as, for typical example, during floating point operations performed by the FP data manipulation logic 43. The various X registers, along with any other dedicated registers included in the stack, may be distributed accordingly; i.e., packed to the appropriate extent.

Those skilled in the art will understand that a result transferred to the cache unit 11 in CPUs of the exemplary class, via result bus 48 in FIG. 3 and result bus 20 in FIG. 2, are usually double word, even if the actual result of a given data manipulation operation is single word in length. A single word result is simply replicated which affords a certain effective redundancy in the is result information stored in the cache unit. The interface switching array circuitry 45 and output switching array circuitry 46 in FIG. 3 can readily and conventionally provide for a two word result movement to the cache unit 11. This is achieved, in the case of a single word AX data manipulation, by simultaneously transferring the result, via the interface switching array circuitry 45, into each of the A and Q registers in the stack 44, and, in the case of an FP data manipulation, by transferring the double word result to the A and Q registers in the stack 44 in concatenation. If a given result is intermediate rather than final, access to the intermediate result in the stack 44 by the AX data manipulation logic and/or the FP data manipulation logic for subsequent operations is also obtained via the bilateral interface switching array circuitry 45.

In a presently preferred embodiment of the invention, the output switching array circuitry 46, which serves to place a final result on the result bus 48, may be considered an element of the AX data manipulation logic 42 as represented by the dashed line 49. This aspect and other features of the invention may better be understood by reference to FIG. 4 in conjunction with FIG. 3.

FIG. 4 shows much of the content of FIG. 3, but presented in a somewhat different context which illustrates more particularly, but still simplified for clarity, a specific implementation of the invention. The blocks, connected by dashed lines, designated microcode/instruction generated addresses 50 and control 51, combine the decoding and control logic in the AX control block 40 and FP control block 41 in FIG. 3. This control circuitry decodes instructions and directs and coordinates the movement of information among the various logic blocks involved in instruction execution. This is is achieved by the timely issuance of transfer signals to multiplexers 52–57 in the manner well known in the art.

Two execution paths are illustrated in FIG. 4, one focusing on the floating point execution logic 65, and the other focusing on the shift/arithmetic logic (ALU) 61 which performs appropriate data manipulation operations to further the execution of an instruction, both in the manner well known in the art. For operations handled by the FP unit, an operand received from the cache unit via bus 39 is available for transfer into the A/Q registers in the register stack 44 through the selective enablement of multiplexers 52, 53. The two-word-wide register stack 44 is divided into Bank A and Bank B, each one-word-wide, as shown. Similarly, for operations handled by the AX unit, the operand is available, via multiplexer 57 and Bank A latch 62, for delivery to the shift/ALU logic 61. In addition, the A and/or Q register contents are available to the shift/ALU logic 61 from the register stack 44 via multiplexers 55, 56 and Bank B latch 63. It will be noted that either Bank A information or Bank B information can be steered to the Bank B latch 63 according to the selective enablement of the multiplexers 55, 56. Similarly, either Bank A information or Bank B information can be steered to the Bank A latch 62 via multiplexer 57.

To carry out operations in the FP unit, the registers in the register stack 44, particularly the A/Q registers, are available in double word concatenations suitable for floating point operations via multiplexer 54. When a floating point operation has been completed by the floating point execution logic 65, it is returned to the A/Q registers in the register stack 44 via multiplexers 52, 53. From the register stack, this floating point result is thus available for subsequent further operations in either the AX or FP units. When a data manipulation operation has been completed by the shift/ALU logic 61, it is similarly returned to the A/Q registers in the register stack 44 via multiplexer 53 for subsequent use.

A given data manipulation operation may provide an intermediate or final result. An intermediate result from the floating point execution logic 65 is transferred back to the register stack 44, through multiplexers 52, 53, to update the A/Q registers (and/or appropriate other registers in the stack) for subsequent use. If the floating point result is final, the final result is also sent to the result bus via latch 59 for transfer to and storage in the cache unit. An intermediate result from the shift/ALU logic 61 may be folded back thereto via multiplexer 57 and Bank A latch 57.

In summary, it will be understood that the information in the register stack 44 is always the latest correct value and is available for use by either the AX unit or the FP unit; (or another co-processing unit) without the necessity for going through a rationalization process or using rationalization circuitry. The register stack 44 may also be made available to other execution units as represented by the additional inputs bus to the multiplexer 53 and additional outputs bus from the multiplexers 55, 56

As previously indicated, there maybe other co-processors, such as the DN unit shown in FIGS. 1 and 2, which communicate with the AX and FP units and utilize the register stack 44 and which send results to the result bus. In FIG. 4, this aspect is represented by the "additional inputs" line set to the multiplexer 53 and the "other result" line set to the multiplexer 58. In practice, there is also provision for selectively reading the contents of the register stack 44 to such additional coprocessor(s) as be expanding the multiplexers 55, 56.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A central processor comprising:

A) a first execution unit for performing data manipulation operations, said first execution unit having an input for receiving information to be processed and an output for issuing a first execution unit result;

B) a second execution unit for performing data manipulation operations, said second execution unit having an input for receiving information to be processed and an output for issuing a second execution unit result;

C) a single accumulator register having an input and an output;

D) means selectively coupling said single accumulator register output to said first execution unit input and to said second execution unit input;

E) means selectively coupling said first execution unit output and said second execution unit output to said single accumulator register input;

F) a single supplementary accumulator register;

G) means selectively coupling said single supplementary accumulator register output to said first execution unit input and to said second execution unit input;

H) means selectively coupling said first execution output and said second execution output to said single supplementary accumulator register input;

I) a multi-level register stack having an input and an output, said register stack being configured two-words-wide;

J) a multi-level register stack input multiplexer switch; and

K) a multi-level register stack output multiplexer switch; and in which:

L) said accumulator register and said supplementary accumulator register are incorporated into said multi-level register stack at the same level;

M) said multi-level register stack input multiplexer switch incorporates:
   1) said means selectively coupling said first execution output and said second execution output to said single accumulator register input; and
   2) said means selectively coupling said first execution output and said second execution output to said single supplemental accumulator register input; and N) said multi-level register stack output multiplexer switch incorporates:
   1) said means selectively coupling said single accumulator register output to said first execution unit input and said second execution unit input; and
   2) said means selectively coupling said single supplementary accumulator register output to said first execution unit input and said second execution unit input.

2. The central processor of claim 1 in which said means selectively coupling said single accumulator register output to said first execution unit input and said second execution unit input and said means selectively coupling said single supplementary accumulator register output to said first execution unit input and said second execution unit input are cooperatively adapted to:

A) selectively couple said single accumulator register output and said single supplementary register output as two separate inputs to said first execution unit; and B) selectively couple said single accumulator register output and said single supplementary register output as a single, concatenated input to said second execution unit.

* * * * *